Patented June 11, 1940

2,203,838

UNITED STATES PATENT OFFICE 2,203,838

COMBUSTION OF FUELS

George B. Murphy and William H. Hubner, Chicago, Ill., assignors to Universal Oil Products Company, Chicago, Ill., a corporation of Delaware No Drawing. Application September 27, 1937, Serial No. 165,942

4 Claims. (Cl. 123—1)

This invention relates more specifically to the combustion of hydrocarbon fuels in compression ignition engines.

In a more specific sense it is concerned with a method of injecting combustion accelerators into the air entering the cylinders of compression ignition engines of the Diesel type to facilitate easier starting and reduce the "ignition-lag" or "delay-angle."

In internal combustion engines which depend upon the heat generated by compression for the ignition of the injected fuel, it is known that the most reliable fuels in regard to ease of ignition and smooth burning under the compression ratios commonly employed which are of the approximate order of from 10:1 to 20:1, are those of a paraffinic character which evidently crack more easily than corresponding fuels containing hydrocarbons of a cyclic character so that active radicals are formed which unite readily with the oxygen in the injected air and instigate the combustion reactions. This requirement of "paraffinicity" to insure combustion characteristics eliminates the majority of cracked distillates as a source of Diesel fuel at least for light Diesel engines and has resulted in considerable experimentation with the object of rendering such distillates usable.

Along the line of improving Diesel operation, a large number of so-called "dopes" or accelerators have been tried which are added in small quantity to the fuel, most of these being oxidized compounds of the character of nitrates or other explosive materials. The present invention approaches the problem from a somewhat different angle.

In one specific embodiment the present invention comprises the injection of controlled amounts of chlorine into the air stream passing to the cylinders of compression ignition engines to increase the ease of ignition and smoothness of burning of the fuels.

It is not intended to advance an exact mechanism for explaining the observed results of chlorine injection, although the suggestion may be made that the effect is catalytic with the formation of intermediate addition compounds between the unsaturated radicals and chlorine. The fact that chlorine could be used as a combustion accelerator was not predictable since there is considerable evidence in support of opposite predictions. Many chlorine compounds such as, for example, carbon tetrachloride, are retarders of combustion and it was a new and unexpected result to find that regulated chlorine injection tended to increase knocking.

Probably the simplest method of operating Diesel engines in accordance with the present invention is to maintain a separate cylinder of compressed chlorine, the cylinder being supplied with a control valve set to deliver regulated amounts of the gas to the air intake. However, it is comprised within the scope of the invention to employ any device or method which will assure the regulated admission of the proper quantities of the chlorine to correct any defects in the ignition or combustion of whatever fuel may be used. It is more or less apparent that different amounts of chlorine will be required for fuels of different chemical composition and combustion characteristics and that the necessary quantities will also vary with such factors as the compression ratio, speed of the engine and other factors. However, extensive experiments have shown that chlorine may be employed as a combustion accelerator with practically any combination of fuel and compression ignition engine.

The following data are introduced to show the effect upon the operation of Diesel engines when injecting regulated quantities of chlorine into the air intake. While the data are typical, they are not introduced for the purpose of unduly limiting the scope of the invention since other types of fuels in different engines would respond to a different extent.

Tests were run on a standard Diesel test engine using a straight run Diesel fuel from a mixed base crude and a corresponding fraction from the cracking of the heavier fractions of the same crude oil. While operating under standard conditions, the amount of chlorine fed to the air intake by weight of the fuel was varied and the improvement in cetane number (which measures the value of Diesel fuels) was noted. The following table shows the results obtained.

*Straight run Diesel fuel*

| | | | | |
|---|---|---|---|---|
| Percent chlorine added | 0 | 1 | 3 | 5 |
| Equivalent cetane number | 66 | 69 | 73 | 74 |

*Cracked Diesel fuel*

| | | | | |
|---|---|---|---|---|
| Percent chlorine added | 0 | 1 | 3 | 5 |
| Equivalent cetane number | 49 | 60 | 64 | 69 |

It will be seen from the above data that the maximum effect of the chlorine occurred in the case of the cracked fuel which is of obvious advantage since an invention of the present character is most needed to improve the combustion properties of cracked distillates.

We claim as our invention:

1. The method of increasing the knock value of Diesel fuels in a compression ignition engine which comprises introducing free chlorine thereto through the air-intake of said engine to accelerate combustion of the Diesel fuel.

2. The method of increasing the knock value of hydrocarbon Diesel fuels of low paraffinicity when used in a compression ignition engine, which comprises introducing free chlorine to the intake of said engine to accelerate combustion of the Diesel fuel.

3. In the operation of compression ignition engines operating upon hydrocarbon Diesel fuels, the method of improving the operation of the engine which comprises adding free chlorine to the air supply for the engine to accelerate combustion of the Diesel fuel.

4. In the operation of compression ignition engines operating upon hydrocarbon Diesel fuels, the method of improving the operation of the engine which comprises adding to the air supply for the engine, as a combustion accelerator for the Diesel fuel, an amount of free chlorine equal to about 1-5% of the fuel.

GEORGE B. MURPHY.
WILLIAM H. HUBNER.